Nov. 15, 1927. 1,648,920
L. H. STREET
AUTOMATIC SAW MILL
Filed Oct. 17, 1925 4 Sheets-Sheet 3
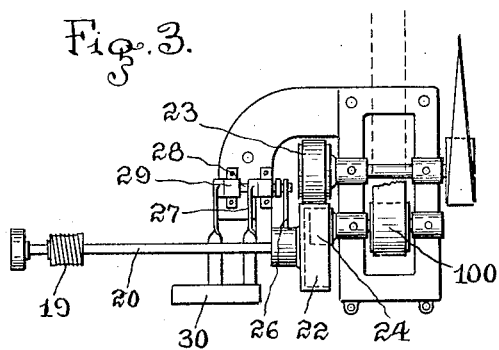
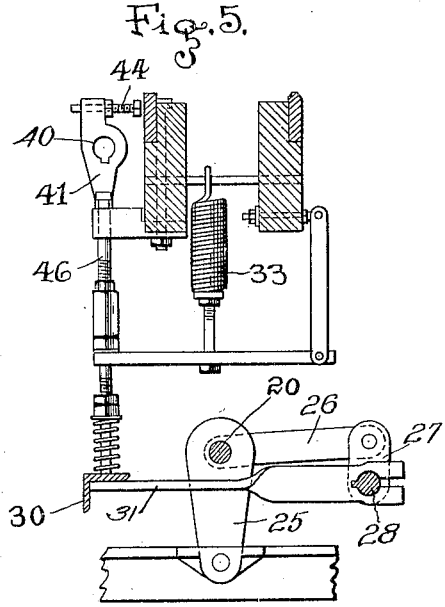
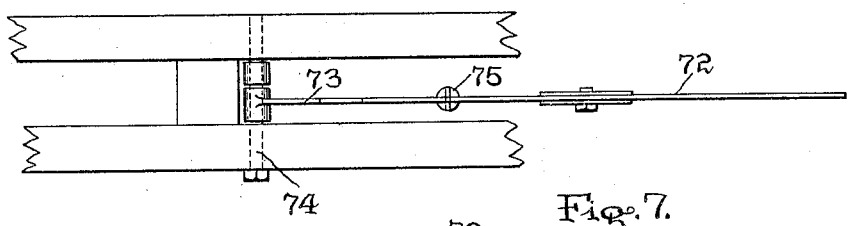
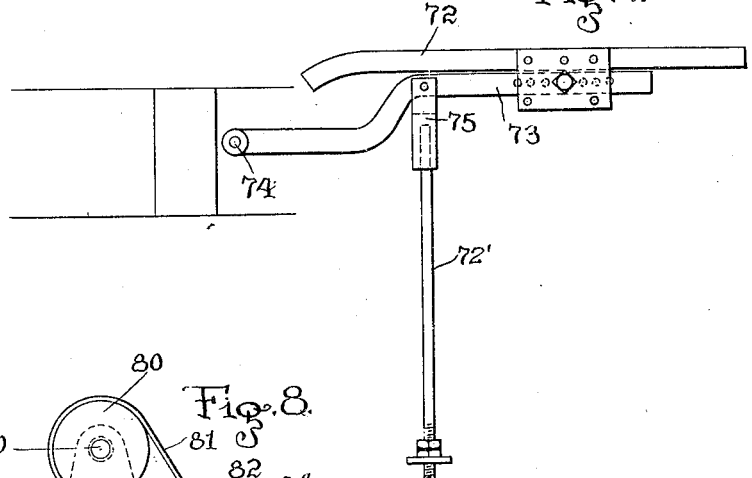
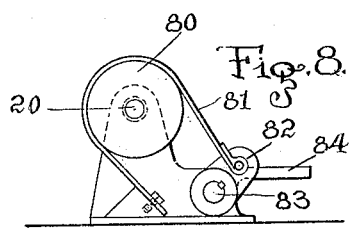
INVENTOR
Louis H. Street
BY
ATTORNEY

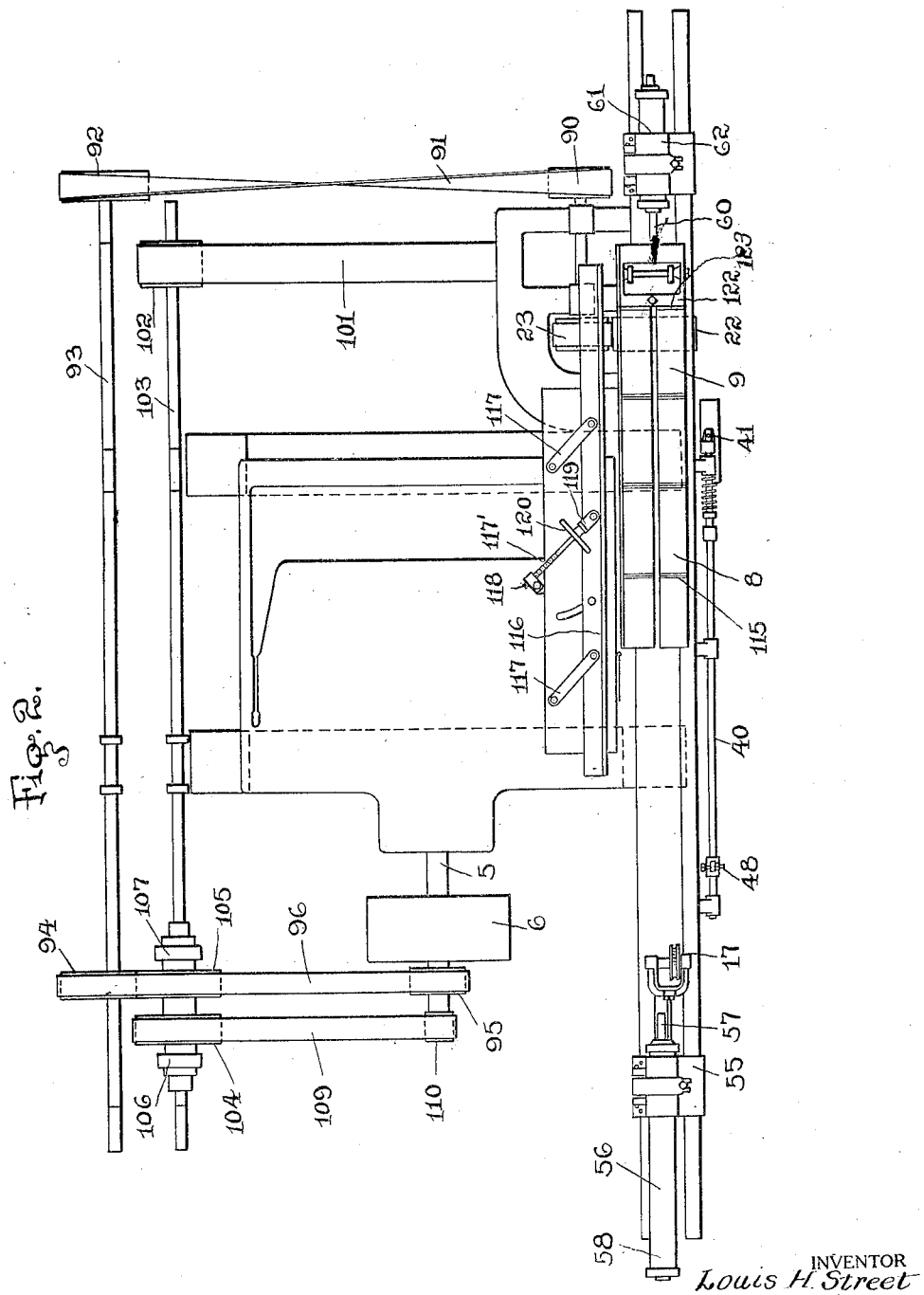

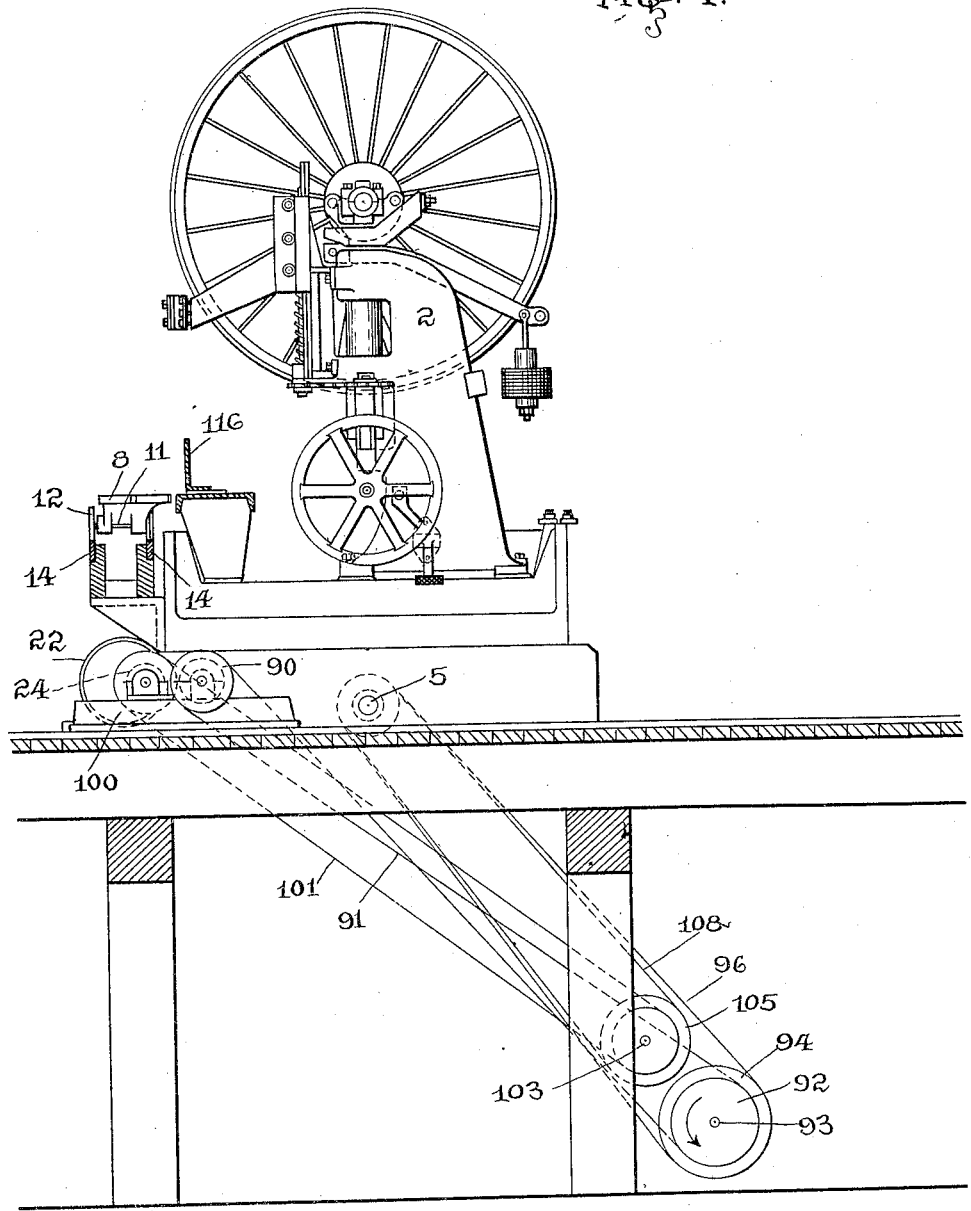

Patented Nov. 15, 1927.

1,648,920

UNITED STATES PATENT OFFICE.

LOUIS H. STREET, OF OLEAN, NEW YORK.

AUTOMATIC SAWMILL.

Application filed October 17, 1925. Serial No. 62,964.

The present invention relates to saw mills of the general type disclosed in prior patent to me, No. 1,499,756 issued July 1, 1924 and comprises improved features thereof designed to materially improve the operation of sawing short logs or "bolts" into dimension stock for use in wood-working plants, as, for example, in the manufacture of bobbins, spindles, automobile spokes and the like.

Important features of the present improvements include mechanism of improved design and arrangement providing for automatic operation of the reciprocating carriage, thereby providing for increased output; a brake and releasing mechanism affording quickly responsive and positive control of the carriage at all times; an improved transmission of the recede drive adapted for operating the recede movement of the carriage at constant speed and independently of the rate of movement for the feeding of the stock to the saw; an improved apparatus whereby the frictions may be put in a neutral or non-engagement position at any time; means for automatically releasing the driving friction at the end of the carriage return movement and immediately preceding reversal of the carriage drive, thereby reducing the shock incidental to reversing the direction of movement; the provision of improved means for preventing the bolt or log from turning on the carriage; means upon the carriage for preventing longitudinal shifting of the stock upon reversal and adjustable means adapted for regulating the length of driving movement of the carriage.

The foregoing and other features and advantages of the present invention will be more fully understood by reference to the accompanying drawings and following detailed description thereof.

In the drawings:

Fig. 2 is a plan view illustrating the driving arrangement for the movable carriage.

Fig. 3 is a partial plan view illustrating the frictional driving mechanism.

Fig. 4 is a view in end elevation.

Fig. 5 is a detailed view in vertical cross section taken on the line 5—5 of Fig. 1 showing the automatic feed actuating mechanism.

Figs. 6 and 7 are, respectively, a detailed plan and partial side elevation illustrating the friction release connections and Fig. 8 is a partial end elevation illustrating the brake control.

Figure 1:
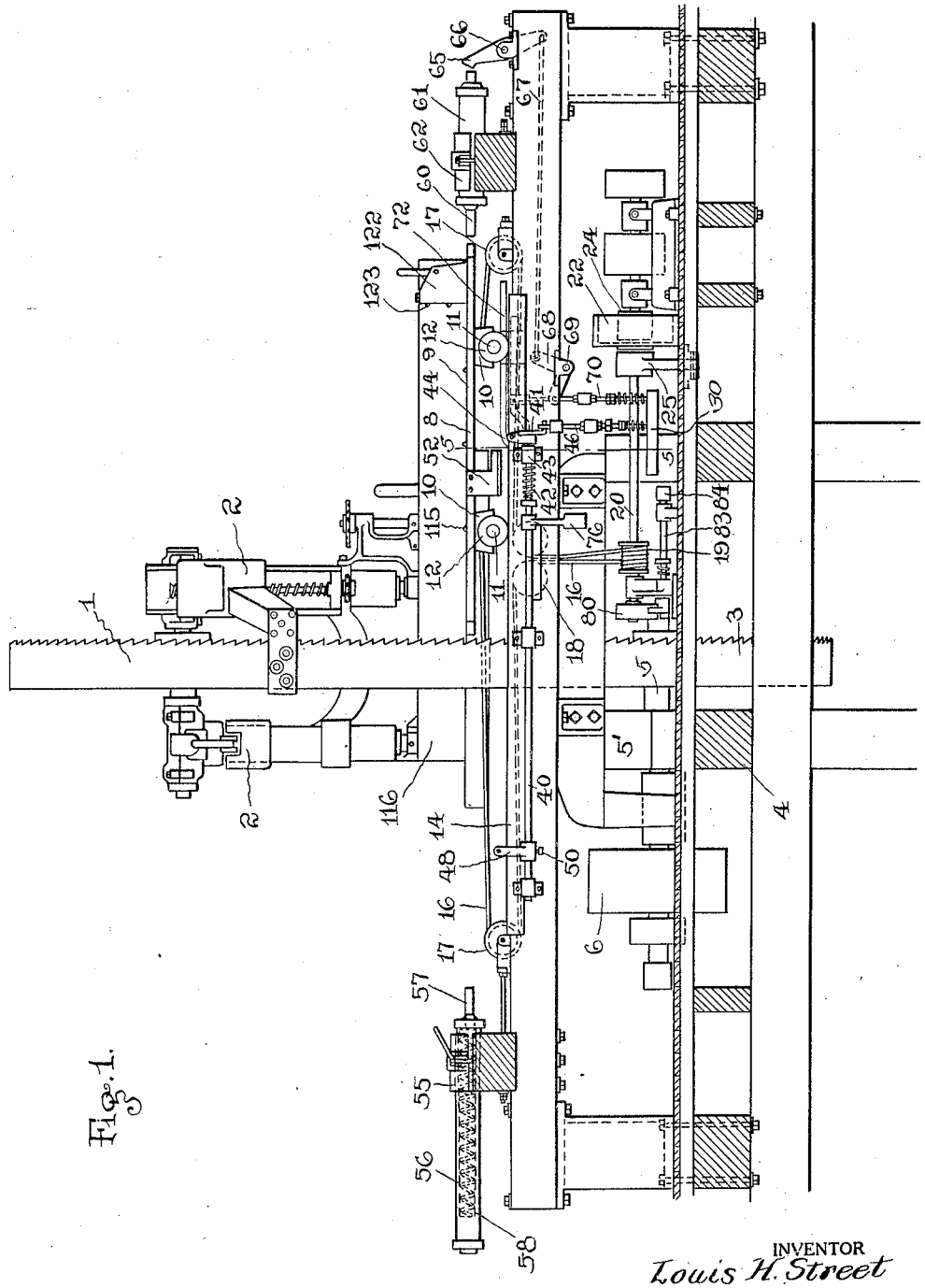
Fig. 1 is a view in side elevation illustrating a saw mill embodying the features of my invention.

In the approved embodiment of the features of my invention as herein disclosed, they are shown incorporated in a saw mill employing a band saw 1 carried upon an upper idler pulley suitably journalled in brackets 2—2 and a lower driving pulley 3 mounted upon a saw driving shaft 5 journalled in frame bearings 5' and having a belt pulley 6 by means of which it is driven. While it will be understood that a circular saw may be employed, I prefer to use a band saw for the reason that the latter is better suited for making a relatively narrow cut or kerf which thereby effects substantial economies in the saving of the stock and reducing waste.

For the feeding of the stock to the saw, a suitable carriage 8 is employed which may be composed of a platform member 9 of suitable length and width to receive the logs thereon and is provided with bearing members 10 on its underside, within which are journalled forwardly and rearwardly positioned axles 11 provided on their outer ends with wheels 12. The wheels 12 bear and ride upon opposite track rails 14 mounted upon and extending longitudinally of the machine frame. The carriage 9, is, accordingly, supported to be movable with relation to the saw in a direction parallel to the saw and the axis of the supporting bearings of the latter. In the usual manner the wheels 12 at one side may be grooved to have retaining engagement with the track rail so as to prevent displacement of the carriage. For driving the carriage a cable 16 is employed and is connected at its ends to the carriage by suitable eye-bolts; is passed over fixed idler wheels 17—17 positioned at the opposite ends of the track and then over the idler wheels 18—18 and around the cable drum 19 affixed to a shaft 20 suitably journalled to be rotatable and extending longitudinally of the supporting frame.

For imparting the driving movement to the carriage for reciprocating the latter, a suitable reversing friction drive is employed. The friction driving mechanism comprises a driven wheel member 22 formed with an annular flange or rim adapted in one position to have external engagement with a fixed friction wheel 23 and in another position to have internal engagement with a friction drive wheel 24. The bearing of shaft 20 carrying the friction wheel 22 is mounted or journalled in a rocker box or bearing arm 25 suitably fulcrumed upon the supporting frame. The rocker member or arm 25 is arranged to be actuated from one position to the other by means of a link 26 (Fig. 5) and crank 27 on the pedal shaft 28 journalled in a suitable bearing bracket 29. A pedal 30 is carried on the outer ends of the long arms 31 of cranks 27 and is normally held by means of a spring 33 in such position that the driven friction wheel 22 engages the return or recede friction drive wheel 23 which operates to drive the cable drum 19 in the direction to propel the carriage upon its backward or return movement. When the pedal is pressed down the driven friction wheel 22 is swung over into engagement with the forward or feed friction drive wheel 24 which then operates to propel the carriage on its forward or cutting stroke.

Suitable means are provided to be operable automatically for reversing the direction of movement of the carriage at the end of its forward travel and also elastic means are provided and adapted to be engaged by the carriage in advance of the action of the reversing movement for the purpose of overcoming the inertia of the carriage and for relieving the stress and wear upon the reversing friction whereby the latter will start easily and quickly for driving the carriage in each direction. Upon one end of a shaft 40 there is affixed a movable shoulder or catch 41 and a torsion spring 42 is fitted to the rod 40 and affixed at one end to a collar thereon and at its opposite end to the bearing bracket 43 to be operative normally to rotate the shaft and shift the catch 41 into a forward position determined by an adjustable stop screw or stud 44 engaging a fixed portion of the machine, Fig. 5. As herein before described, the spring 33 is operative normally to elevate the pedal 30 and to effect the recede driving engagement for the carriage and upon pressing the pedal, against the influence of the spring 33, the feed drive is put in operation. The purpose of the catch or movable shoulder 41 is to retain the foot pedal in depressed position throughout the period of the feeding movement and this is effected in its normal position overlying a slidably mounted retaining rod 46 having a yielding connection with the pedal lever. The structure, accordingly, provides that when the pedal is depressed, the retaining shoulder or catch 41 will be moved by the spring 42 into position for retaining the driving mechanism in engagement and upon the catch shoulder being moved rearwardly from its overlying position, the pedal will be released and elevated by means of the spring 33 for the reversing drive. For automatically effecting the release of the catch with the resulting operation of the reverse drive at the end of the carriage movement, an adjustable trip arm 48, Fig. 1 is secured by set screw 50 upon the rock shaft 40 in position to be engaged by a trip member 52 mounted upon the carriage and operating to shift the trip-arm 48 outwardly to rock the shaft 40 against the influence of spring 42 and thereby move the retaining shoulder 41 inwardly, to release the retaining rod 46 and allow the drive mechanism to reverse under the normal action of the spring 33.

The elastic means provided for cushioning the reversing action of the carriage and for overcoming the inertia with the result of assisting the reverse consists of suitable spring plunger buffers positioned to be engaged by the carriage at the extremities of its movement. As here shown, the buffer devices comprise a forward buffer comprising a housing or securing member 55 having adjustably fitted therein tubular casing 56 having a movable plunger 57 fitted therein and acted upon by a coil spring 58. The rearward buffer is of generally similar construction having a movable plunger 60 extended longitudinally through a spring casing 61 secured by housing 62 and acted upon by a spring normally retaining the plunger in forward position. As will be readily understood, upon being engaged by the carriage, the plungers will be forced in the direction of the carriage movement and against the influence of the springs whereby the latter will react to exert a reversing pressure upon the carriage and accordingly function to cushion the impact of the carriage with the stops, thus afforded and likewise to assist in the reversing action.

In further accordance with my invention, mechanism is provided operative automatically to throw into operation the feed drive at the end of the recede movement of the carriage thereby to provide normally for continuous or full automatic movement of the carriage. In the approved arrangement for this purpose as here shown, the automatic feed drive connections are arranged to be actuated by the plunger member 60 of the rearward buffer device, the plunger of which is extended rearwardly and positioned to engage a rocking or trip-arm 65 Fig. 1 fulcrumed upon the frame at 66 and having its lower arm extension connected by a rod 67 to one arm of a bell crank lever 68 fulcrumed at 69 and having its other arm connected to a vertically movable rod 70 having bearing engagement upon the starting pedal member 30. Upon being engaged by the carriage, the plunger 60 will be moved rearwardly, transmitting a like movement to the upper end of arm 65 and, in consequence, moving the bell crank 68 to effect the depression of the pedal 30 and as a result throwing in the feed drive. Upon being so automatically depressed, the foot pedal will be retained by means of the catch shoulder 41 until the catch is again rocked rearwardly or released by the engagement of the carriage with the trip-arm 48 as heretofore described.

A further desirable feature of my present developments consists of means operative at the latter part of the carriage recede movement to throw out the recede friction and to retain the operating frictions in a neutral position. As a result the recede drive is released prior to contact of the carriage with the buffer thereby minimizing the shock or impact which otherwise would be too severe. The mechanism provided therefore consists of a release bar 72 mounted with an adjustable sliding fit upon a vertically movable arm or bar 73 Fig. 7 pivotally secured at 74 upon a fixed pin so as to be movable in a vertical plane. By a suitable connection 75 the bar 73 is connected to the push rod 72' of the automatic feed connections whereby upon depression of the bar 73 a like movement is communicated to the starting pedal through the push rod 72'. In operation upon its return movement the carriage axle will strike and ride upon the release bar 72 depressing it sufficiently to depress the foot pedal through the push rod 72', a distance required to throw the frictions into intermediate or out of contact position which is maintained throughout the period of engagement of the axle with the release bar. When the carriage strikes the rear plunger or buffer the foot pedal will be further depressed to throw in the feed frictions as hereinbefore described thereby starting the carriage forward again on its feed movement. As will be understood, the timing of the release bar action is adjustably determined by the adjustment of the release bar 72 upon its supporting bar 73 and it is so adjusted that the momentum of the receding carriage will properly actuate the automatic trip-arm 65, and the release bar 72 is further so positioned with relation to the carriage axle whereby the movement imparted thereby will be just sufficient to throw the driving friction mechanism into the neutral position wherein no driving movement is transmitted.

On the rock shaft 40 there is provided an arm or lever 76 in position to be conveniently engaged by the knee of the operator, and upon being so engaged and pressed rearwardly against the influence of the spring 42, the retaining member or catch 41 is moved into releasing position with relation to the presser rod 46 whereby it is prevented from holding down the foot pedal. As a result the feed drive will be disconnected and the recede friction driving connections will be thrown in to start the carriage in its rearward movement or stroke.

Associated with the described mechanism there is further provided means for locking the carriage consisting of a brake wheel 80 Figs. 1 and 8 applied to the end of the shaft 20 carrying the cable drum 19. To the brake wheel 80 there is fitted a constriction brake band 81 connected to an arm 82 upon a suitably journalled brake shaft 83 having attached to its opposite end a foot or brake pedal 84. The braking means so provided is operable under the foot pressure of the operator for instantly stopping the rotation of the cable drum to lock the carriage in any position with a slipping of the drive friction or with the drive frictions in neutral positions when the carriage engages the recede release bar as later described. There is accordingly provided convenient and positively responsive means to enable the operator to stop the carriage at its initial position at the start of the feed movement or through the instrumentality of the foot brake to stop the carriage instantly and in any position.

A further desirable feature of the present improvements is best illustrated in Figs. 2 and 4 and consists of an improved driving arrangement for the recede adapted for operating the latter at constant speed and independently of the feed drive, the speed of which may be varied for meeting specific conditions and classes of stock. In the construction as shown, the recede drive wheel has mounted on its shaft a pulley 90 to which motion is transmitted by means of belt 91 from a pulley 92 on a suitably journalled recede drive shaft 93 having adjacent its opposite end a pulley 94 receiving motion from a drive pulley 95 by means of connecting belt 96. The driving pulley 95 as shown, is mounted upon a main drive shaft arbor 5 having a main driving pulley 6 thereon to receive power from a suitable source. For the driving of the feed friction, the shaft thereof is provided with a pulley 100 connected by a belt 101 to a pulley 102 mounted upon a suitable feed shaft 103 having journalled upon its opposite end belt pulleys 104 and 105 adapted to be connected to the feed drive shaft by means of suitable clutch connections 106 and 107. The pulley 105 is driven by the pulley 95 by means of a belt 108 positioned upon belt 96 and the pulley 104 is driven by means of belt 109 from a smaller pulley 110 mounted upon the driving arbor 5. The construction accordingly provided that the feed drive shaft 103 may have the driving motion transmitted thereto from either the larger or smaller pulleys 95—110 by throwing in either of the clutches 107 or 106 with the result that the driving friction may be driven at different speeds as may be desired, while the recede friction will be driven at a constant speed suited to its proper operation and operable to effect its quick return and as aforesaid independently of the rate of feeding motion.

The machine of the present disclosure embodies further improvements adapted for more effectively holding the bolt from turning or displacement thereby contributing to the facility of operation. As will be understood, when the carriage strikes the recede spring plunger it is immediately started back on its recede motion at an accelerated speed, thereby causing a tendency to slip away from the bolt or flitch carried thereby. To oppose this slipping action, there is provided upon the upper surface of the carriage a series of steel strips 115 suitably spaced and extending transversely of the carriage, the strips being positioned on edge with their projecting upper edges sharpened, thereby presenting knife edges for engagement with the bolt.

For the purpose of guiding the bolt in its forward movement and for gauging the thickness or width of the cuts, there is shown the usual adjustable guide 116 which may be a steel angle mounted upon the table portion of the frame. As shown, the guide is pivotally connected by means of links 117 to be movable in constant parallel relation to the travel of the carriage and is secured in position by means of an adjusting screw 117 threaded to a pivotally secured bearing 118 upon the frame and rotatably connected to a pivotal bearing 119 connected to the guide and is provided with a manipulating hand wheel 120.

Mounted upon the carriage at the rear thereof there is provided the usual abutment member or knee 122 adjustably secured upon the carriage in position to be engaged by the end of the bolt. The bolt or stock is initially round and it is accordingly important that it should be kept from turning on the carriage during the first cut. For this purpose, there is incorporated with the knee an improved and effective means therefor in which it consists in providing the forward face of the knee with a projecting knife edge 123 positioned to engage or impale the end of the bolt to prevent rotation thereof. The knife edge may desirably be in the form of a steel strip inserted in the face of the knee extending horizontally thereagainst and having a projecting and sharpened outer edge and in operation it will be understood that when placing the bolt upon the carriage it is forced thereagainst with sufficient pressure to effect the securing engagement. Upon completing the first cut, the bolt is ordinarily turned upon its flattened side and the knife edge is advantageous in that it effectively secures the bolt against turning, is at all times effective and offers no interference to the ready manipulation of the bolt.

The improved construction as described allows of the required adjustment for cutting up stock of different length. The adjustment for this purpose and as will be readily understood consists in adjusting the position of the knee member 122 longitudinally of the carriage with relation to the length of the bolts to be sawed and correspondingly adjusting the length of the carriage travel by the proper setting of the recede trip arm 48 and adjusting the rearward spring buffer 57 by shifting of the tubular casing 56 thereof to properly cooperate with the carriage and relating to its point of reversal.

While there is here shown an approved embodiment of the features of my invention, it will be understood that various modifications may be made thereon without departing from the scope of the invention as defined in the appended claims. It is, accordingly, intended that all matter herein shall be interpreted as illustrative and not in a limiting sense.

Having described my invention, I claim:

1. In a saw mill, the combination with a carriage, of forward and reverse driving means for driving the carriage in opposite directions, automatically operating mechanism operative at the end of the movement in each direction to reverse the driving means whereby the carriage will be normally operated with a continuous reciprocating movement for feeding and return of the carriage and manually operated means for reversing the carriage movement, intermediate either direction of travel.

2. In a saw mill, the combination with a carriage, of a reversing driving mechanism operatively connected to drive the carriage in opposite directions, connections operative automatically to reverse the driving mechanism at the end of each carriage movement whereby the carriage normally will be operated continuously with a feed and return reciprocal movement and manually operated means operable to render the reversing connections effective intermediate the forward movement of the carriage whereby the latter will be stopped and reversed.

3. In a saw mill, the combination with a carriage, of frictional driving mechanism adapted to drive the carriage in opposite directions, connections operative automatically to reverse the driving mechanism at the end of each carriage movement whereby the carriage normally will be operated continuously with a feed and return reciprocal movement, manually operated means operable to render the reversing connections effective intermediate the forward movement of the carriage and braking means operable to stop the carriage on the said reverse movement thereof.

4. In a saw mill, the combination with a carriage, of frictional driving mechanism adapted to drive the carriage in opposite directions, connections operative automatically to reverse the driving mechanism at the end of each carriage movement whereby the carriage normally will be operated continuously with a feed and return reciprocal movement, manually operated means operable to render the reversing connections effective intermediate the forward movement of the carriage for reversing the carriage and braking means adapted to stop the carriage in either of its movements by slipping of the reversing drive connections.

5. In a saw mill, the combination with a carriage, of a reversing driving means for driving the carriage in opposite directions, automatically operating mechanism operative at the end of the movement in each direction to reverse the driving means whereby the carriage will be normally operated with a continuous reciprocating movement for feeding and return of the carriage, resilient means positioned to be engaged by the carriage at the end of its movement for arresting the carriage and starting it on its return movement and releasing means for the driving connections arranged to be operated by the carriage immediately in advance of the reversal for the feed drive for reducing the shock of reversal.

6. In a saw mill, the combination with a carriage, of a reversing driving means for driving the carriage in opposite directions, automatically operating mechanism operative at the end of the movement in each direction to reverse the driving means whereby the carriage will be normally operated with a continuous reciprocating movement for feeding and return of the carriage, resilient means positioned to be engaged by the carriage at the end of its movement for arresting the carriage and starting it on its return movement and releasing means for the driving connections arranged to be operated by the carriage immediately in advance of the reversal for the feed drive for reducing the shock of reversal and manually operated means for stopping the carriage movement, substantially as described 7. In a saw mill, the combination with a carriage, of a reversing driving mechanism operatively connected for driving the carriage in opposite directions with a continuous reciprocating movement, actuating connections for the driving mechanism comprising resilient means arranged normally to effect engagement for driving the carriage in one direction, means engaged by the carriage at the end of its said movement and operative to reverse the driving mechanism, retaining means adapted for retaining the driving mechanism in operating engagement throughout the travel of the carriage in the latter direction, said retaining means comprising a rock shaft suitably journalled, a movable shoulder or catch carried thereon to have retaining engagement with the driving mechanism actuating connections, a trip shoulder adjustably mounted upon the rock shaft to be engaged by the carriage at the end of its travel for releasing the retaining shoulder engagement and a lever upon the rock shaft for manual manipulation thereof.

8. In a saw mill, the combination with a carriage, of a reversing driving means for driving the carriage in opposite directions, means operative at the end of the movement of the carriage in each direction to reverse the driving means whereby the carriage will be given a continuous reciprocating movement, resilient means positioned to be engaged by the carriage at the end of its movement for arresting the carriage and starting its return and releasing means arranged to be operated by the carriage immediately in advance of reversal for the feed drive and adapted to position the driving means in a released or neutral position so as to reduce the shock of reversal.

9. In a saw mill, the combination with a carriage, of a reversing driving mechanism for driving the carriage in opposite directions, said driving means being capable of assuming a neutral non-driving position, actuating connections for the driving mechanism adapted to effect engagement thereof for driving the carriage in each direction whereby the carriage is continuously reciprocated, releasing means arranged to be operated by the carriage in advance of reversal of the driving mechanism for the feed driving, said releasing means consisting of a movable arm member and connections therefrom to the actuating connections of the driving mechanism, said arm being arranged to be moved by the engagement of the carriage to position the driving mechanism in a released or neutral position for reducing the shock of reversal.

Signed at Olean in the county of Cattaraugus and State of New York this 30th day of July, A. D. 1925.

LOUIS H. STREET.